May 27, 1952    J. C. TELLIER    2,598,084
ANGLE MODULATED SIGNAL DEMODULATOR SYSTEM
Filed Sept. 13, 1946    2 SHEETS—SHEET 1
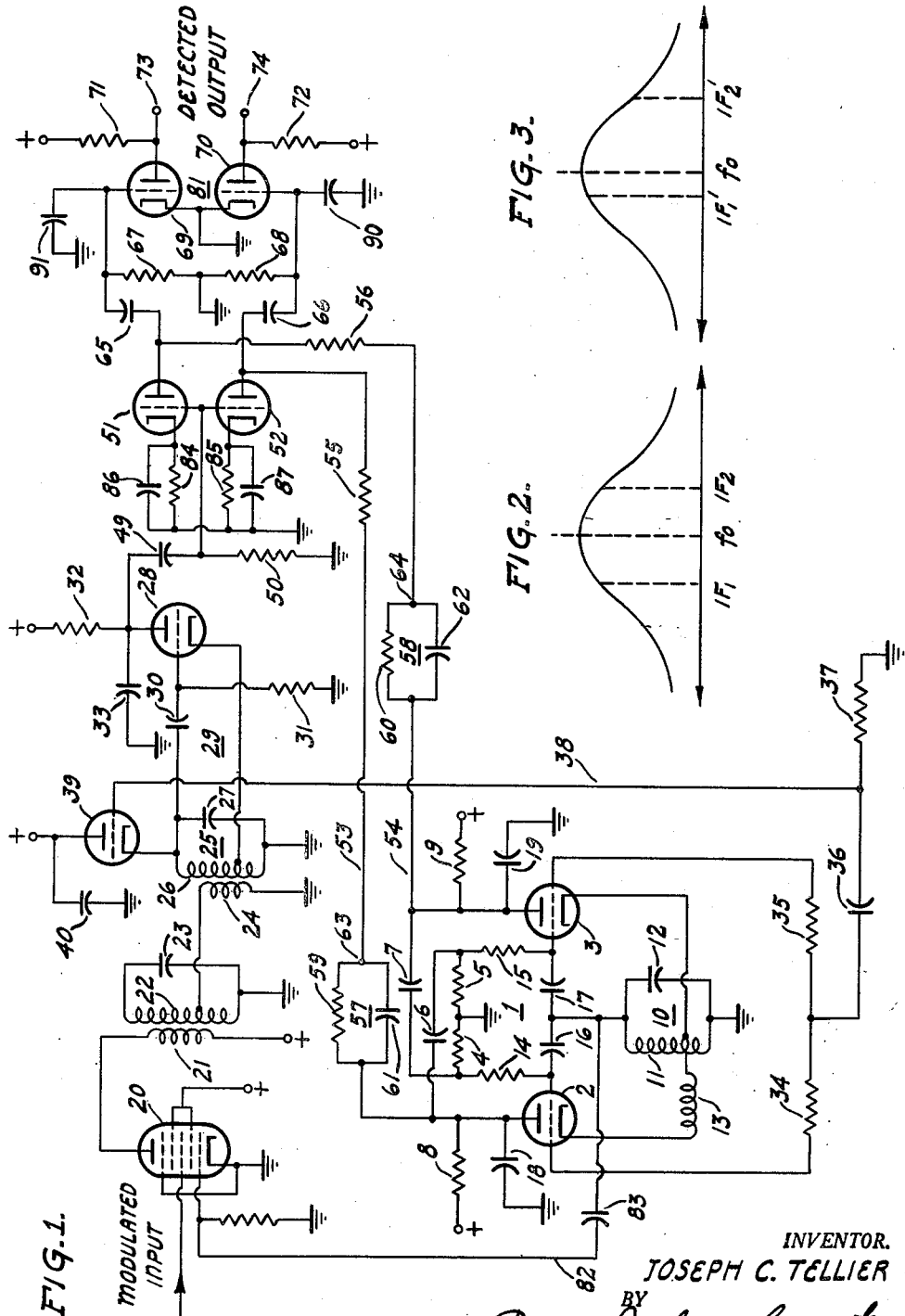
INVENTOR.
JOSEPH C. TELLIER
BY
Brown, Denk & Lynnestvedt
AGENTS May 27, 1952     J. C. TELLIER     2,598,084
ANGLE MODULATED SIGNAL DEMODULATOR SYSTEM
Filed Sept. 13, 1946     2 SHEETS—SHEET 2
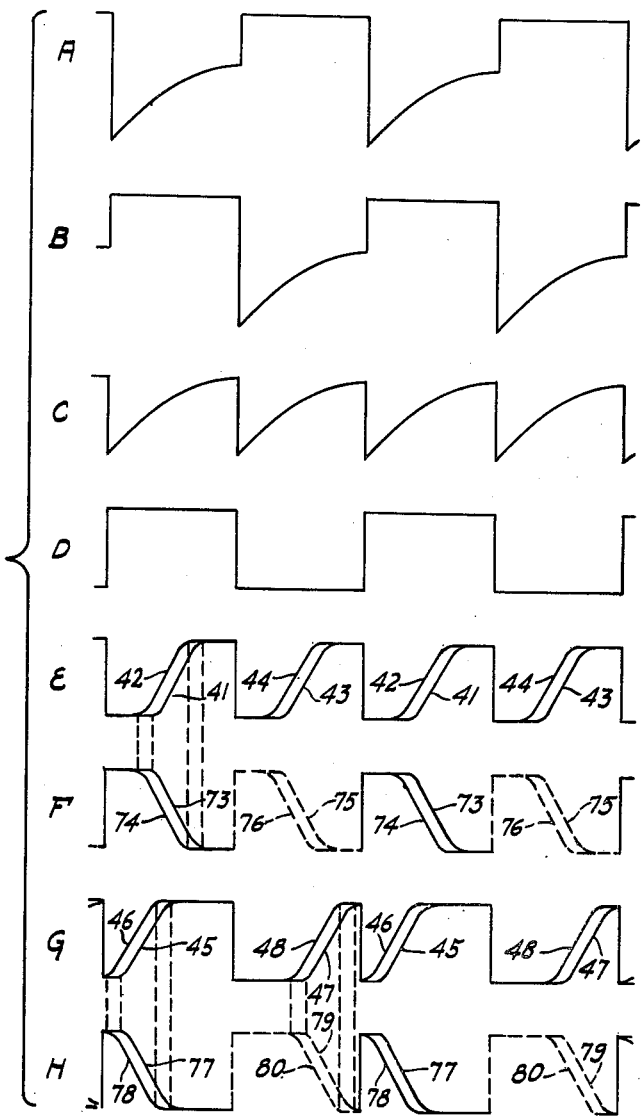
INVENTOR.
JOSEPH C. TELLIER
BY
Brown, Denk & Lynnestvedt
AGENTS Patented May 27, 1952

2,598,084

UNITED STATES PATENT OFFICE 2,598,084

ANGLE MODULATED SIGNAL DEMODULATOR SYSTEM

Joseph C. Tellier, Penn Wynne, Pa., assignor to Philco Corporation, Philadelphia, Pa., a corporation of Pennsylvania Application September 13, 1946, Serial No. 696,824

7 Claims. (Cl. 250—20)

This invention relates to methods of and means for detecting angular-velocity modulated carrier wave signals. More specifically it relates to detectors of angular-velocity modulation of a carrier wave signal which are adapted to have minimum responsiveness to modulation of or variations in the amplitude of the carrier wave signal.

It is known to provide, in a detector of angular-velocity modulated carrier wave signals, a pair of signal transducers, each having a selective response characteristic, the maximum responses of said transducers being disposed respectively above and below the center, or carrier, frequency of the angular-velocity modulated carrier wave signal to be detected. Such means are disclosed, for example, in Patent 2,351,193 of June 13, 1944, to Murray G. Crosby for a Frequency Modulation Detector Circuit. In such a system the outputs of the two detectors are substantially equal so long as there is no departure from the center or carrier frequency. However, whenever such departure occurs, the outputs of the transducers will differ owing to the difference in the frequencies at which their maximum responses occur. Their outputs are subtracted by suitable means and the value of the resultant difference signal is then a function of the departure of the input signal from the center or carrier frequency (i. e. the angular-velocity modulation of the carrier wave signal). It has been found that it is very difficult, if not practically impossible, in such a system, to make the characteristics of the two transducers identical. As a result they will generally respond somewhat differently to variations in the amplitude of input signals even when there is no variation in frequency. Thus the resultant signal obtained by subtraction of the two outputs will contain variations corresponding to variations in amplitude as well as to variations in frequency of the input signal. This is generally undesirable in a frequency or phase modulation detector.

In accordance with the present invention, means are provided whereby detection of angular velocity modulations of a carrier wave signal may be effected in a manner similar to that above referred to, while employing but a single transducer having a frequency selective response characteristic. Thus it is possible more completely to eliminate the variations in the output signal corresponding to variations in the amplitude of the input signal which are present when two such transducers are used. This is done by deriving, from the angular velocity modulated carrier wave signal, two similarly modulated signals having different carrier frequencies displaced by equal amounts, respectively above and below the frequency at which the single frequency-selective transducer has its maximum response, or with respect to which its selectivity characteristic is symmetrical. The two carriers thus derived are alternately applied to the input of the single transducer, and separate outputs are derived therefrom corresponding respectively to each carrier. In the absence of any deviation in frequency from the original carrier, the two outputs will be substantially identical and, when subtracted, will yield a net output of zero. Any departure from the center or carrier frequency, however, will cause the outputs to differ, whereupon the resultant difference signal will be proportional to such departure. The same frequency responsive transducer being employed to produce both outputs, any variations in the amplitude of the original modulated carrier wave signal will appear to an equal extent in both, and will cancel in the production, by subtraction, of the resultant output signal.

In the single representative embodiment of the invention hereinafter to be described, the incoming angular velocity modulated carrier wave signal is alternately beat with two differing local oscillator frequencies to produce an intermediate frequency signal modulated in essentially the same manner as the original, but whose carrier frequency alternates between two different values. This signal is supplied to a superregenerative amplifier having a tank circuit tuned to a frequency intermediate those of the two I.-F. carriers. The superregenerator is unquenched once during each alternation to permit oscillations to build up in its tank circuit at a time following unquenching which is determined by the amplitude of the I.-F. signal then present and the extent by which its frequency departs from the resonant frequency of the superregenerator tank. In this embodiment the quench oscillator used to control the operation of the superregenerator also generates the local oscillator signal which alternates between two different frequencies at the quench rate, and furthermore supplies a signal to control the operation of a circuit which separates the outputs of the superregenerator, corresponding respectively to the two I.-F. input signals, into two separate channels, from which they are supplied to a push-pull subtractor circuit.

Although, in the embodiment shown and described, the frequency-selective transducer takes the form of a superregenerative amplifier, it is to be understood that the invention is not confined in its application to superregenerative devices.

Indeed, any known form of frequency responsive amplifier or transducer may be used.

To summarize; the primary object of the invention is to provide a detector of angular velocity modulated carrier wave signals, the output of which is substantially independent of variations in the amplitude of the input signal.

Another object of the invention is to provide such a detector employing but a single frequency responsive circuit.

Still another object is to provide a detector of angular velocity modulated carrier wave signals in which, from an incoming modulated carrier wave signal, is derived a signal modulated substantially in accordance with the original signal, but whose carrier frequency alternates between two differing values, which derived signal is supplied to a single frequency responsive circuit for detection.

A further object of the invention is to provide a detector, in accordance with the foregoing objectives, employing a superregenerative amplifier as a frequency responsive circuit, and employing a common oscillator to effect the derivation of the modulated signal whose carrier frequency alternates, to control quenching of the superregenerator, and, furthermore, to control channeling of the superregenerator outputs corresponding respectively to alternate values of carrier.

The invention, in its more detailed aspects, together with other objectives and advantages thereof, will be more fully understood upon reading the following description with reference to the accompanying drawings in which:

Figure 1 is a schematic diagram of a representative embodiment of the invention, while Figures 2, 3 and 4 constitute graphical representations of characteristics and wave forms, existing at various points in the circuit according to Figure 1, which will be referred to in explaining the principle and mode of operation of the invention.

Referring now to Figure 1, triode vacuum tubes 2 and 3, together with resistors 4 and 5 in their grid circuits, condensers 6 and 7 connecting the grid of each tube to the plate of the other, and resistors 8 and 9 in their respective plate circuits, form a conventional multivibrator oscillator, 1. This oscillator is constructed and arranged so as to oscillate in the usual manner, with tubes 2 and 3 alternately conducting, at a frequency of, for example, 25 kilocycles which, for reasons which will be set forth later, is half the quench frequency. This provides a quench frequency which is outside the audible range so as to prevent quench frequency components from being perceptible in the superregenerator output, while at the same time being sufficiently low to provide adequate superregenerator sensitivity. However, inasmuch as the oscillator 1 is to perform functions additional to that of a quench oscillator, its circuit is modified from that of a conventional multivibrator by the inclusion of tank circuit 10, comprising inductor 11 and condenser 12. The latter is connected to the grids of each of tubes 2 and 3 through condensers 16 and 17 respectively, and the cathodes of both tubes are connected to a tap on inductor 11, a part of which is thereby included in both grid and plate circuits of both tubes to provide the necessary feedback to render each tube capable of oscillating independently. The frequencies of these two oscillators are made higher than the quench frequency, as primarily determined by tuned circuit 10, which, for example, may be tuned to approximately 40 megacycles; but the frequency of oscillation of one tube is made slightly different from that of the other by the inclusion of inductor 13 in the connection from the cathode of tube 2 to the tap on inductor 11. This difference may, for example, be 150 kilocycles so that the actual frequencies of oscillation may be 40 megacycles ±75 kilocycles. By reason of the fact that the tubes are alternately conducting, because of their connection in the multivibrator circuit above described, they will alternately oscillate at these two different frequencies, and output from both may be derived from the common tank circuit 10. The plates of tubes 2 and 3 are by-passed to ground for their separate oscillating frequencies by condensers 18 and 19 respectively. The complete circuit of oscillator 1, as above described, is within the scope of the invention claimed in my copending application, Serial No. 695,017, filed September 5, 1946, now Patent No. 2,589,455 granted March 18, 1952, and represents a slight modification of the representative embodiment described therein.

Output from tank circuit 10 of oscillator 1 is supplied through connection 82, including coupling condenser 83, to a grid of a conventional pentagrid mixer tube 20 where it is beat with a phase- or frequency-modulated carrier wave signal supplied to another grid of the tube from a source not shown. Output of the mixer tube appearing in inductor 21, connected in its plate circuit, will be an intermediate frequency signal having substantially the same modulation as the input signal, but whose carrier alternates between two different frequency values. Thus, if the input carrier is 50 megacycles, the values of the two I.-F. carriers, IF$_1$ and IF$_2$ may be 10 megacycles ±75 kilocycles. This intermediate frequency signal is supplied through a suitable coupling network, comprising inductors 22 and 24 and condenser 23, to a resonant tank circuit 25 comprising inductor 26 and condenser 27. The tank circuit 25 forms, in conjunction with triode 28, a superregenerative amplifier 29 which is adjusted so as to have a frequency selective response characteristic, as represented in Figure 2, having a maximum response at a frequency $f_0$ intermediate the two I.-F. carriers IF$_1$ and IF$_2$. The superregenerator is conventional in form, tube 28 having its grid connected to one side of tank circuit 25 through a coupling condenser 30, and to ground through a grid resistor 31; its cathode connected to a tap on inductor 26 so as to provide the necessary feedback; and its plate impedance 32 by-passed for components at the superregenerative oscillator frequency by means of condenser 33.

As has already been mentioned, the frequency of oscillator 1 is half the desired quench frequency. This is owing to the fact that, during each cycle of oscillation, the signal developed across tuned circuit 10, and which is supplied to the converter tube 20, alternates between two different frequency values. Likewise, the carrier frequency of the intermediate frequency signal supplied to the superregenerator tank 25 alternates between the frequency values IF$_1$ and IF$_2$ during each cycle of oscillator 1. It is desired to unquench the superregenerator and permit oscillations to build up in its tank circuit once during each such alternation. This requires a quench controlling signal having a frequency twice that of the oscillator 1, which, as will now be explained, can readily be obtained by combining the signals appearing on the grids of both tubes 2 and 3 of oscillator 1. The signals thus combined are shown at A and B respectively in Figure 4, and the resultant quench controlling signal, having twice the frequency of oscillator 1, is shown at C in Figure 4. The combined wave is derived from the junction point of resistors 34 and 35 (which are preferably of equal value) forming a voltage divider connected between the grids of tubes 2 and 3. This signal is supplied to an R. C. circuit, comprising condenser 36 and resistor 37, and thence through connection 38 to the grid of quench tube 39. Preferably the time constant of this R. C. circuit is made long compared to the quench period so as to bias tube 39 beyond cut-off during a portion of each quench cycle. Condenser 40 is of a value such as to present low impedance at the frequency at which the superregenerator oscillates, and therefore tube 39 is connected effectively in shunt with superregenerator tank circuit 25. During the time that tube 39 is cut off, it has no appreciable effect on the operation of the superregenerator. However, when it is rendered conducting by the signal supplied to its grid from oscillator 1, it introduces damping into tank circuit 25 to damp the oscillations built up therein during the unquenched interval. By operating tube 39 at very low plate voltage (e. g. 25 volts), a large change in its cathode input impedance from the quenched to the unquenched condition (e. g. from 1,000 ohms to a theoretically infinite value) can be obtained in response to but a very small (e. g. 1 volt) variation in the quench controlling signal applied to its grid.

If desired, and if the circuits are carefully designed, the quench tube 39, may be omitted and the quenching signal applied directly to the grid of the superregenerator tube 28. However, the inclusion of the quench tube greatly enhances the operation of the circuit and its use is to be preferred.

By the application to quench tube 39 of the quench controlling signal derived from the grids of oscillator tubes 2 and 3, superregenerative oscillator 29 is rendered susceptible of oscillating once during each alternation of the carrier frequency of the I.-F. signal supplied to its tank circuit 25. During relatively short intervals between such periods, damping is introduced into tank circuit 25, in the manner already explained, to damp out oscillations which may have originated therein during preceding unquenched intervals. During each unquenched interval, the time at which oscillations commence to build up is determined by the magnitude and frequency of the I.-F. signal impressed on tank circuit 25. In general such buildup will commence sooner, the more nearly the impressed signal corresponds in frequency to the frequency $f_0$ at which the maximum responsiveness of the superregenerator occurs. If the alternate I.-F. carriers $IF_1$ and $IF_2$ are originally displaced by equal amounts respectively above and below the frequency $f_0$, if the response characteristic is made essentially symmetrical, and if, further, no modulation is present in the incoming signal supplied to mixer tube 20, then during successive cycles of the superregenerator, its output will be substantially constant. This is readily apparent from Figure 2, and at E in Figure 4 is shown the resulting wave form appearing across the superregenerator plate resistance 32 of Figure 1. Near the beginning of each cycle the grid of superregenerator tube 28 is at zero bias, and the plate voltage is relatively low. Depending on both the amplitude and frequency of the I.-F. signal applied to tank circuit 25 at the time of unquenching, oscillations will, at some time during the cycle commence to build up therein and will continue to build up until tube overload occurs. Thus, for a given amplitude and frequency of applied I.-F. signal at the time of unquenching, the curve 41 at E in Figure 4 may represent the envelope of oscillations in tank circuit 25. For an applied signal of larger amplitude, or whose frequency is nearer to $f_0$, buildup will occur sooner as represented by curve 42. Similar curves 43 and 44 represent the envelope of oscillations during alternate unquenched intervals of superregenerator 29. If, as above assumed, the two carriers $IF_1$ and $IF_2$ are displaced by equal amounts respectively above and below $f_0$, and if neither amplitude- nor frequency-modulation is present, build-up of oscillations in tank circuit 25 will take place at the same time and at the same rate during each successive cycle as clearly shown at E in Figure 4.

If the frequency or phase of the input signal to mixer tube 20 is modulated, the frequency of the I.-F. signals derived therefrom will be correspondingly shifted to higher or lower values, but in the same direction during alternate cycles. Thus, for example, they may appear with reference to the superregenerator frequency response characteristic as shown at $IF'_1$ and $IF'_2$ in Figure 3. Under these circumstances oscillation in tank circuit 25 (Figure 1) will commence at different times in successive cycles as shown at G in Figure 4. Here, curves 45 and 46 represent the envelopes of oscillations in tank circuit 25 corresponding to $IF'_1$ of Figure 3 and corresponding respectively to different amplitudes of $IF'_1$, while curves 47 and 48 represent the envelopes corresponding to $IF'_2$ of Figures 3 and likewise, respectively, to different amplitudes thereof. It is apparent that the shift in the frequencies of $IF'_1$ and $IF'_2$, produced by frequency modulation of the input signal to mixer 20, brings $IF'_1$ nearer to, while moving $IF'_2$ away from, $f_0$, and thereby produces a difference in output from superregenerator 29 during successive cycles thereof, the reason for which is apparent from a consideration of Figure 3. This difference is clearly shown at G in Figure 4.

In order to compare the outputs of superregenerator 29 during successive cycles and thereby derive an indication of the angular velocity modulation of the carrier wave signal supplied to mixer tube 20, it is convenient first to separate the outputs corresponding respectively to alternate values of the intermediate frequency carrier wave signal supplied to the superregenerator tank 25. The signals thus separated may then be supplied to a push-pull amplifier, the output of which will vary in amplitude in accordance with the difference in output from superregenerator 29 during successive cycles of its operation. To this end, referring again to Figure 1, the output of superregenerator 29, which may be derived from a connection to the plate circuit of tube 28, is supplied through coupling condenser 49 and across resistor 50 to the grids of channeling amplifier tubes 51 and 52. These tubes are normally biased through the action of R. C. biasing networks comprising resistors 84 and 85 and condensers 86 and 87 and their plate voltage is supplied through connections 53 and 54 and plate resistors 55 and 56 from the plates of tubes 2 and 3 respectively of oscillator 1. Connections 53 and 54 also include respectively R. C. circuits 57 and 58, each comprising one of resistors 59 and 60 and one of condensers 61 and 62. Each of resistors 59 and 60 is made of such magnitude that the plate current drop across it is sufficient to make the voltages at points 63 and 64 respectively zero at the points in the cycle of oscillator 1 at which the voltages on the plates of tubes 2 and 3 respectively are lowest. Condensers 61 and 62 are made sufficiently large to eliminate both quench and audio frequency variations from the voltage supplied to the plates of amplifier tubes 51 and 52. The voltage wave thus supplied to the plate of one of the tubes will be substantially as represented at D in Figure 4, while that supplied to the plate of the other tube will be the inverse of that shown at D. Each tube will thereby be rendered alternately conducting and there will appear in its plate circuit only a portion of the output of superregenerator 29 corresponding to one of the alternate I.-F. signals. These outputs are supplied through coupling condensers 65 and 66 across resistors 67 and 68 respectively to the grids of push-pull amplifier tubes 69 and 70, in the respective plate circuits of which are connected resistors 71 and 72.

In the absence of frequency- or phase-modulation of the input signal to mixer tube 20, the output from one of the channeling amplifiers 51, 52 will be as represented by the solid lines 73 or 74 at F in Figure 4, while the output from the other channeling amplifier will be as represented by the broken lines 75 or 76 in the same figure. Quench frequency components present in these signals are filtered out through the cooperation of condensers 90 and 91 with resistors 55 and 56 respectively. Inasmuch as the signal supplied to both push-pull tubes from the channeling amplifier is equal, under these circumstances, no output will appear between terminal 73 and 74.

Where, however, the input signal to mixer tube 20 is frequency- or phase-modulated the output from one of the channeling amplifiers 51, 52 will be as represented by solid lines 77 or 78 at H in Figure 4, while the output from the other channeling amplifier will be as represented by broken lines 79 or 80 in the same figure. These outputs being relatively unequal for successive intervals, there will appear between terminals 73 and 74 of the push-pull amplifier an output signal proportional to the instantaneous frequency- or phase-modulation of the input signal to the system. It will be apparent, however, that regardless of frequency modulation of the input signal, any amplitude modulation thereof will appear to an equal extent in the outputs of superregenerative amplifier 29 in alternate cycles of its operation, will be cancelled out in push-pull amplifier 81, and will not appear in the detected output at terminals 73, 74.

For purposes of illustration only, there are set forth immediately hereinafter values of circuit constants and other design date which, taken with reference to the other information hereinbefore set forth, will enable those skilled in the art, to which the invention relates, to construct and use it. It is to be understood, however, that none of these data are to be regarded as limiting the scope of my invention as defined in the appended claims:

| | |
|---|---|
| Triodes 2 and 3 | Type 6SN7 |
| Resistors 4 and 5 | 68,000 ohms |
| Condensers 6 and 7 | 100μμ farads |
| Resistors 8 and 9 | 100,000 ohms |
| Resistors 14 and 15 | 22,000 ohms |
| Condensers 16 and 17 | 22μμ farads |
| Condensers 18 and 19 | 100μμ farads |
| Condenser 83 | 5μμ farads |
| Tube 20 | Type 7Q7 |
| Tubes 28 and 39 | Type 6SN7 |
| Condenser 30 | 47μμ farads |
| Resistor 31 | 22,000 ohms |
| Resistor 32 | 10,000 ohms |
| Condenser 33 | 100μμ farads |
| Resistors 34 and 35 | 120,000 ohms |
| Condenser 36 | 470μμ farads |
| Resistor 37 | 10 megohms |
| Condenser 49 | 0.025μ farad |
| Resistor 50 | 15 megohms |
| Tubes 51 and 52 | Type 6SL7 |
| Resistors 55 and 56 | 100,000 ohms |
| Resistors 59 and 60 | 1.5 megohms |
| Condensers 61 and 62 | 5600μμ farads |
| Condensers 65 and 66 | 0.05μ farad |
| Resistors 67 and 68 | 1 megohm |
| Resistors 84 and 85 | 1,000 ohms |
| Condensers 86 and 87 | 10μ farads |
| Condensers 90 and 91 | 1,000μμ farads |

I claim:

1. In a receiver of angular-velocity modulated carrier wave signals, means supplied with an incoming modulated signal for producing modulated signals of two differing carrier frequencies, each having, during at least certain intervals, substantially the same modulation as said incoming signal, a normally quenched superregenerative oscillator having a frequency-selective response characteristic, means alternately supplying said produced signals to and simultaneously unquenching said oscillator, means deriving separate outputs from said oscillator, corresponding respectively to said different carrier frequency input signals, and means detecting differences between said outputs.

2. In a receiver of angular-velocity modulated carrier wave signals, an oscillator alternately generating oscillations at two differing frequencies, means heterodyning an incoming modulated signal with the output of said oscillator to produce, during alternate intervals, signals of differing carrier frequency respectively modulated substantially in accordance with the modulation of said incoming signal during said intervals, a normally quenched superregenerator supplied with said produced signals, means unquenching said superregenerator during portions at least of said intervals, and means measuring the difference in output of said superregenerator during alternate intervals.

3. In a receiver of angular-velocity modulated carrier wave signals, a source of an alternating control signal, means supplied with an incoming modulated signal and responsive to said control signal for producing signals having substantially the same modulation as said incoming signal but differing in carrier frequency during successive alternations of said control signal, a normally quenched superregenerator supplied with said produced signals, means responsive to said control signal for unquenching said superregenerator during at least portions of the alternations of said control signal, and means responsive to said control signal for deriving an output signal whose value is a function of the difference in output of said superregenerator during alternate unquenched intervals.

4. In a receiver of angular-velocity modulated carrier wave signals, a source of an alternating control signal, means supplied with an incoming modulated signal and responsive to said control signal for producing signals having substantially the same modulation as said incoming signal but differing in carrier frequency during successive alternations of said control signal, a normally quenched superregenerator supplied with said produced signals, means responsive to said control signal for unquenching said superregenerator during at least portions of the alternations of said control signal, and means for deriving an output signal whose value is a function of the difference in output of said superregenerator during alternate unquenched intervals.

5. In a receiver of angular-velocity modulated carrier wave signals, means supplied with an incoming modulated signal for producing a pair of modulated signals of differing carrier frequency, each having, during at least certain intervals, substantially the same modulation as said incoming signal, a frequency discriminatory device alternately supplied with said produced modulated signals, said frequency discriminatory device having a bandwidth sufficient to pass both of said last-named modulated signals and having a resonant frequency intermediate the carrier frequencies of said signals, and means for deriving a signal proportional to the difference between the output of said frequency discriminatory device produced in response to one of said modulated signals of differing carrier frequency and the output of said frequency discriminatory device in response to the other of said modulated signals of differing carrier frequency.

6. In a receiver of angular-velocity modulated carrier wave signals, means supplied with an incoming modulated signal for producing a pair of modulated signals of differing carrier frequency, each having, during at least certain intervals, substantially the same modulation as said incoming signal, a frequency discriminatory device alternately supplied with said produced modulated signals, said frequency discriminatory device having a bandwidth sufficient to pass both of said last-named modulated signals and having a resonant frequency displaced by substantially equal amounts with reference to the carrier frequencies of each of said signals, and means for deriving a signal proportional to the difference between the output of said frequency discriminatory device produced in response to one of said modulated signals of differing carrier frequency and the output of said frequency discriminatory device in response to the other of said modulated signals of differing carrier frequency.

7. In a receiver of angular-velocity modulated carrier wave signals, a source of an angular-velocity modulated carrier wave signal comprising frequency components lying principally within a predetermined relatively narrow frequency band, a frequency discriminatory device having an effective bandwidth relatively substantially wider than said predetermined band, means supplied with said modulated carrier wave signal for producing separate signals having differing carrier frequencies, each of said signals comprising frequency components lying principally within the effective bandwidth of said frequency discriminatory device and each having, during at least certain intervals, substantially the same modulation as said first-named signal, means for supplying said last-named signals to said frequency discriminatory device, and means for separately and selectively deriving from said frequency discriminatory device outputs produced respectively in response to said signals of differing carrier frequencies, and means for detecting differences between said outputs.

JOSEPH C. TELLIER.

REFERENCES CITED

The following references are of record in the file of this patent:

UNITED STATES PATENTS

| Number | Name | Date |
| --- | --- | --- |
| 2,092,442 | Colwell | Sept. 7, 1937 |
| 2,351,193 | Crosby | June 13, 1944 |
| 2,363,651 | Crosby | Nov. 28, 1944 |
| 2,379,748 | Roberts | July 3, 1945 |
| 2,416,794 | Crosby | Mar. 4, 1947 |
| 2,419,984 | Boothroyd | May 6, 1947 |
| 2,428,265 | Crosby | Sept. 30, 1947 |

OTHER REFERENCES

Bell, "Reduction of Band Width in F. M. Receivers," Wireless Engineer, November 1942, pages 497 to 502. (Copy in 250-20.28.)